J. F. & H. E. SIPE.
SPRING WHEEL FOR VEHICLES.
APPLICATION FILED FEB. 11, 1910.
1,108,632.
Patented Aug. 25, 1914.
5 SHEETS—SHEET 3.
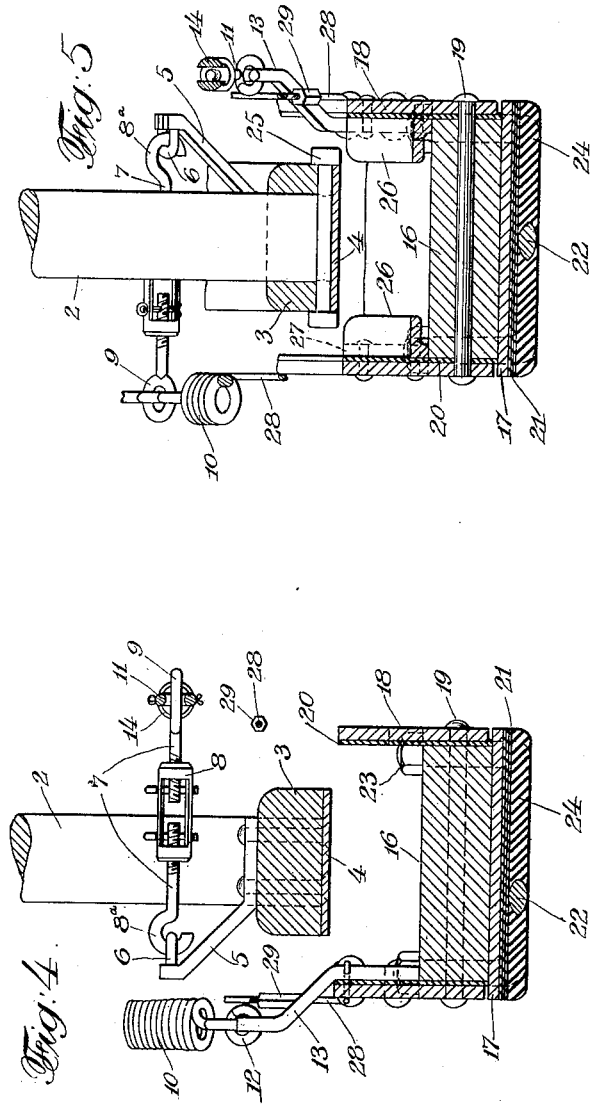
Witnesses:
J. O. Gempler
George Schlatt
John F. Sipe,
Harry E. Sipe,
Inventors,
By their Attorneys
Kenyon & Kenyon.

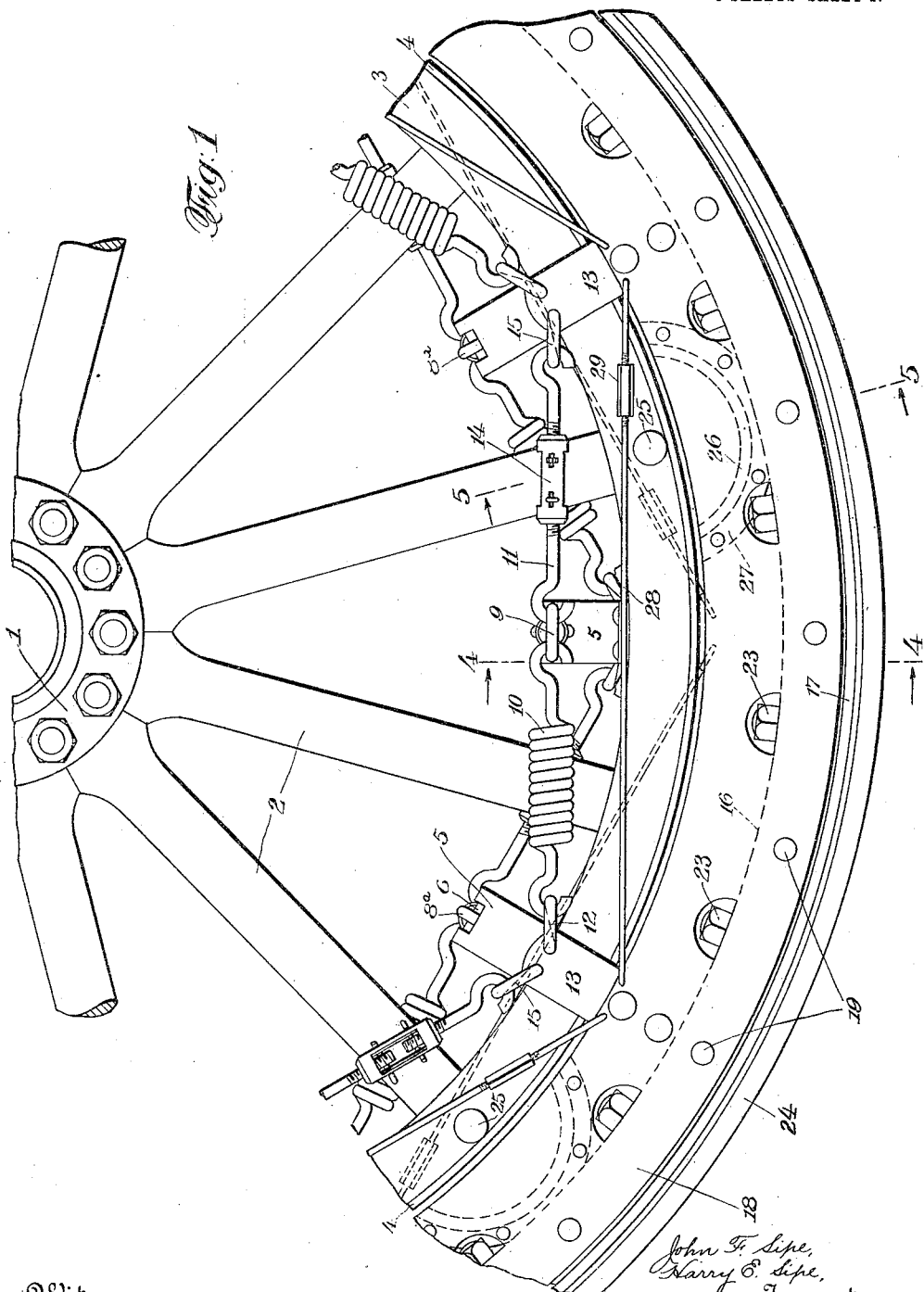

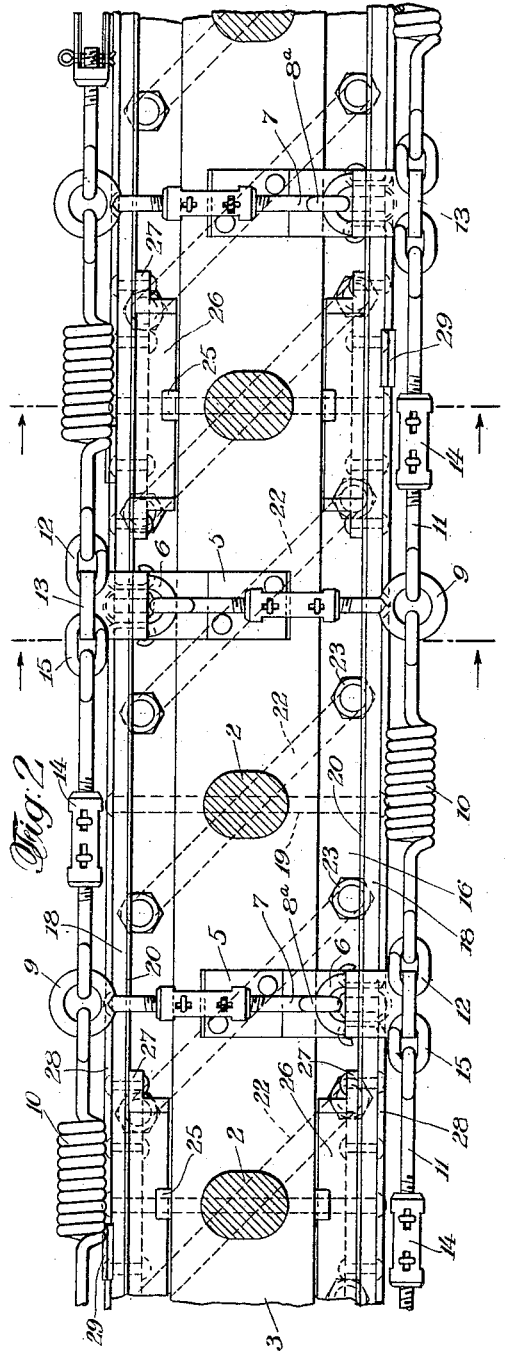
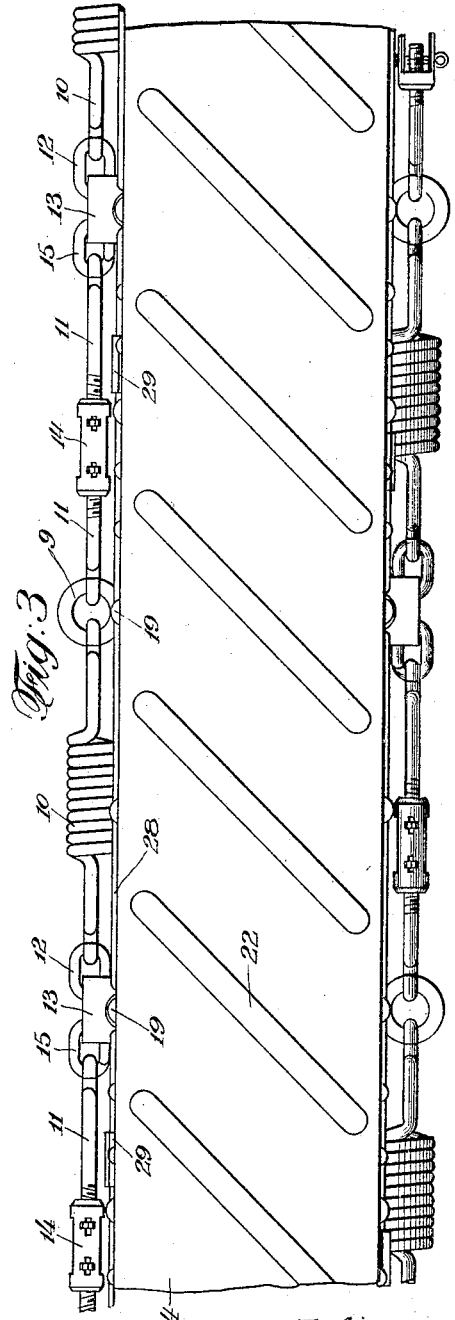

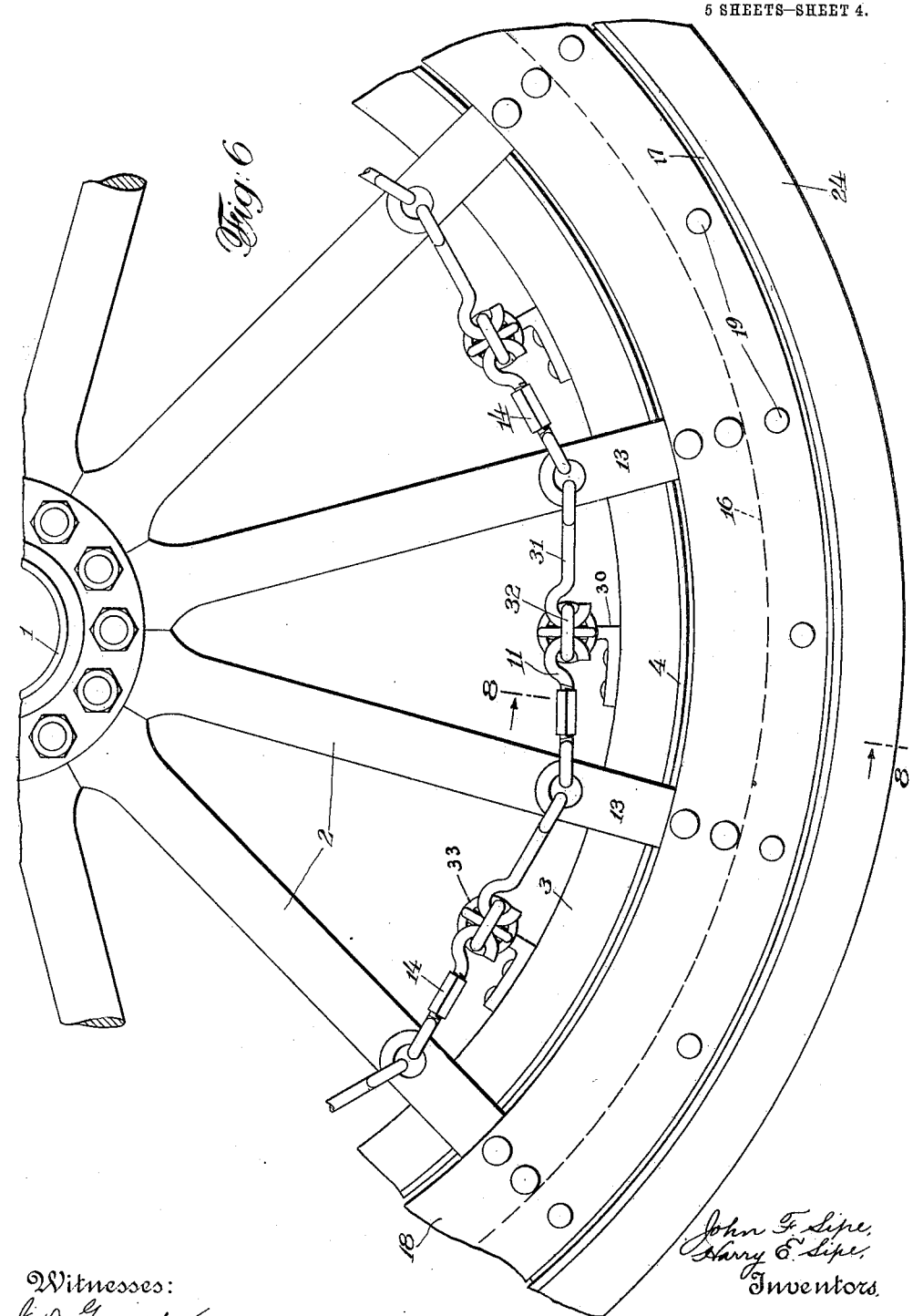

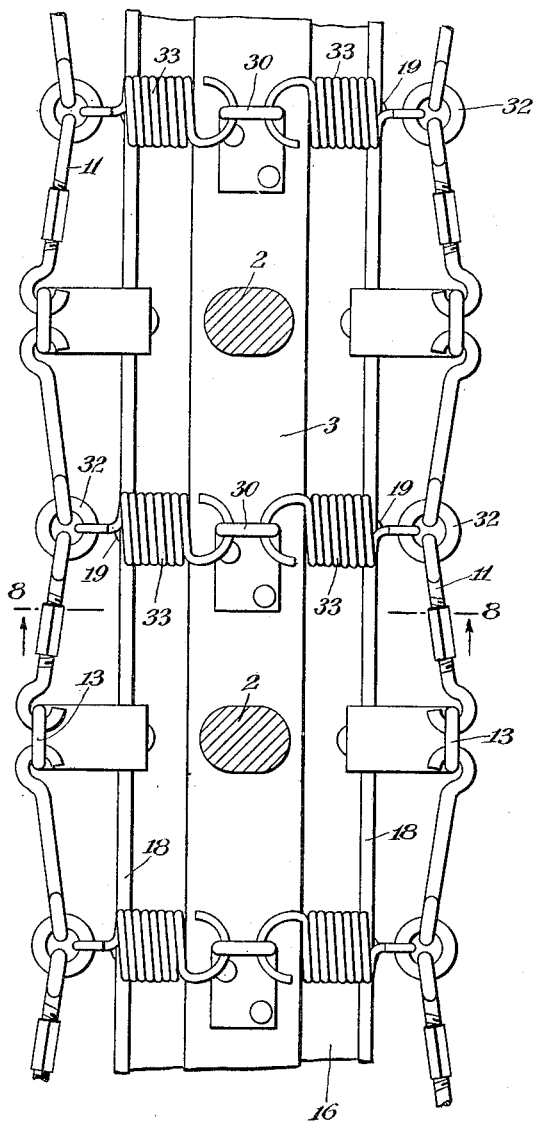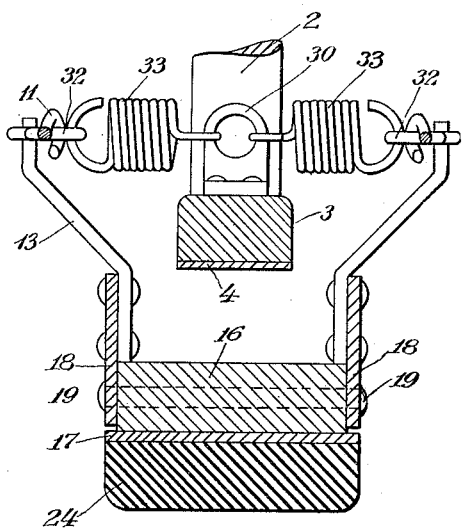

UNITED STATES PATENT OFFICE.

JOHN F. SIPE AND HARRY E. SIPE, OF NEW YORK, N. Y.

SPRING-WHEEL FOR VEHICLES.

1,108,632.  Specification of Letters Patent.  Patented Aug. 25, 1914.

Application filed February 11, 1910. Serial No. 543,268.

*To all whom it may concern:*

Be it known that we, JOHN F. SIPE and HARRY E. SIPE, citizens of the United States, and residents of New York city, in the county and State of New York, have invented certain new and useful Improvements in Spring-Wheels for Vehicles, of which the following is a specification.

The invention relates to an improvement in spring wheels for vehicles, and the objects of the same are to secure a very wide range of resilience with a relatively small number of light springs; to secure a very great movement of the hub member of the wheel relatively to the tread member, with only a slight extension of the springs; to provide means for limiting the lateral movement between the hub member and the tread member, and for giving to the wheel great lateral strength; to provide means for limiting the torsional movement of the hub member relatively to the tread member so as to protect the springs against injury by too great an extension thereof; to provide a tread member which is simple and compact in form and which can be readily applied to the forms of wheels which are now ordinarily in use; to do away, so far as possible, with the noises due to the vibration of the parts; to provide a construction in which the springs have a very wide range of capacity, as a result of which the same springs may be effectively used in automobiles varying greatly in weight; to enable the springs to be easily adjusted to varying weights and conditions; to enable the parts to be quickly and easily replaced in case of breakage or wear; and to enable the different springs to be so arranged as to be brought into action at different times and under different conditions; and to secure other advantages hereinafter enumerated.

The invention consists first in employing a plurality of yielding suspension devices attached at both ends to one of the members of the wheel, and a plurality of operating devices connected at one end to the suspension devices, and attached at the other end by movable joints to the other member of the wheel. In the best form of the invention the yielding suspension device is provided with a spring portion at some part thereof, the suspension devices are placed at an angle to the axis of the wheel, and the operating devices are placed approximately parallel to the axis of the wheel.

The invention also consists in certain other features of construction and combinations of parts hereinafter described and particularly pointed out in the claims.

The invention is illustrated in the accompanying drawings in which—

Figure 1 is a side view of a part of a wheel embodying the said invention. Fig. 2 is a partial sectional view of the wheel taken through the spokes of the hub member showing a top view of the felly of the hub member, and the suspension devices and operating devices connecting the two members together; Fig. 3 is a bottom view of the part shown in Fig. 2; Fig. 4 is a sectional view through the tread member and the felly of the hub member taken on the line 4—4 of Fig. 1; Fig. 5 is a similar sectional view taken on the line 5—5 of Fig. 1; Fig. 6 is a side view of a part of a wheel showing a modification of the invention; Fig. 7 is a sectional view similar to that of Fig. 2 showing the modified construction illustrated in Fig. 6; and Fig. 8 is a cross-sectional view on the line 8—8 of Fig. 7.

Similar numbers denote similar parts in the different figures.

Referring to the drawings, 1 is the hub of the wheel; 2, 2 are the spokes; 3 is a wooden felly attached to the spokes; 4 is a steel band attached in any suitable manner to the periphery of the felly 3; 5, 5 are brackets which are bolted or otherwise suitably fastened to the inside of the felly 3, and are preferably placed midway between the spokes of the wheel, as shown in Fig. 1. These brackets project alternately from opposite sides of the felly 3 as illustrated in Fig. 2. The upper end of each bracket is provided with an eye 6. The parts already enumerated constitute the wheel member containing the hub, or what may be called the hub member of the wheel.

7 is an operating device. It consists of a rod which is divided into two parts, as shown in Fig. 4, and is provided with a turnbuckle 8 of any ordinary construction, joining the two parts by means of which the length of the operating device may be adjusted. The rod is provided at one end with a hook 8ª adapted to engage with the eye 6 of the bracket 5. The hook 8ª and eye 6 constitute a movable joint between the hub member and the operating device 7. The other end of the rod 7 is provided with a ring 9, by means of which the rod is connected with the suspension device. In this form of the invention the suspension device consists of two parts, namely, the coiled spring 10 and the rod 11. The spring 10 is provided with hooks at each end. The hook at one end is adapted to engage with the link 12 which passes through a hole or opening in the bracket 13 which is connected, as hereinafter described, with the tread member. The link 12 is capable of turning or swinging in the opening or bearing in the bracket 13. The hook at the other end of the spring 10 is adapted to engage with the ring 9 at the outer end of the operating rod 7. The rod 11 is made in two parts, as shown, and is provided at its middle part with a turn-buckle 14, by means of which the length of the rod may be adjusted. The rod 11 is provided with hooks at both ends. The hook at one end is adapted to engage with the ring 9, and the hook at the other end engages with a link 15 which passes through an opening in the adjoining bracket 13 so as to turn or swing in said opening or bearing.

16 is a wooden felly constituting a part of the tread member of the wheel. This felly is preferably made three and three-quarter inches larger in inside diameter than the outside diameter of the steel band 4 of the hub member.

17 is a steel band which is fastened in any suitable manner to the periphery of the felly 16.

18 is an annular steel side plate which is bolted by means of bolts 19, or otherwise suitably fastened, to the side of the felly 16. There is one of these plates on each side of the tread member.

20 is a layer of sound-preventing body, such as rubber compound or felt, which is placed between the side plates 18 and the felly 16 for the purpose of preventing noise. The brackets 13 are bolted or otherwise fastened to the inner surface of the plates 18 as clearly shown in Fig. 4, and the upper ends of these brackets are provided with suitable holes or eyes to receive the links 12. The brackets 13 connected with one side plate 18, alternate with the brackets 13 connected with the other side plate 18.

The tread member is provided with a tire as follows. 21 is a layer of fabric, preferably Sea Island cotton combined with rubber, which is placed on the outer surface of the steel band 17. This layer is made about an eighth of an inch in thickness. It is held in place by metal bands or rods 22, made round or square or elliptical in shape, and having a diameter of from one-half to three-quarters of an inch, and formed into a U-shape, as shown in the drawings. The arms of these U-shaped metal bands pass up through holes in the layer 21 and the steel bands 17, and the felly 16, and are securely fastened in place by the nuts 23 which bear down on the upper surface of the felly 16. Apertures are provided in the side plates 18 to receive these nuts as clearly shown in Fig. 1.

The metal bands 22 are spaced about three inches from center to center and at an angle of about forty-five degrees across the face of the tread. A rubber compound 24 is then built up upon the outer surface of the layer 21 and around the metal bands 22 until it is even with or slightly above the outer surface of the metal bands, after which these parts are vulcanized together in any well known manner. In this vulcanizing process the layer 21 may or may not be vulcanized to the steel band 17. If the layer 21 is vulcanized to the steel band 17 this in itself helps to hold the layer 21 in position. If the layer 21 is not vulcanized to the steel band, the layer is held in position by the metal bands or rods 22 which prevent the movement or displacement of the tire on the steel bands 17. The layer 21 is preferably vulcanized to the band 17.

We do not in this application claim the form of tire herein shown and described, as we have reserved such claims for a separate application.

For the purpose of limiting the torsional movement of the hub member within the tread member, the following means are employed. 25, 25 are a series of bolts, see Fig. 5, which are passed through the felly 3, and are provided with projecting members on both sides of the felly projecting out about half an inch from the side thereof. 26, 26 are curved plates semi-circular in shape and provided with flanges 27, see Fig. 1, with which they are bolted to the inner surface of the side plates 18. These plates project inwardly from the side plates 18 so as to be within the path of motion of the bolts 25. These plates are made with a diameter of about three and three-quarter inches. They act as a stop for the projections or bolts 25 so as to limit the torsional movement of the hub member within the tread member.

28 are steel rods or bars of proper weight which are fastened at opposite ends to the side plates 18, as shown in Fig. 1, near the inner edges of those plates, and which act as trusses to strengthen the tread member and prevent it from being bent out of shape. These trusses are provided with turn-buckles 29, by means of which their tension can be properly regulated.

The hub member and the tread member, having been constructed in the manner already described, can be very easily and quickly connected with each other by means of the suspension devices and the operating devices.

The spring 10 and the rod 11 are merely hooked into the links 12 and 15 and the ring 9 of the operating device, and the operating device at its other end is simply hooked into the eye 6 on the bracket 5. The parts having been assembled in this way the tension of the several parts can be easily adjusted by means of the turn-buckles 8 and 14.

It will be seen that in this construction there is a relatively large movement of the hub for a very slight extension of the spring 10. The hub member is capable of movement within the tread member for a distance of one and seven-eighths inches in a radial direction or in a torsional direction. This amount of movement can be secured by an extension of only about one-eighth of an inch in the several springs 10, this result being due to the manner of attachment and operation of the springs. As the required movement or extension of the spring is so very small, a very short spring may be used, thereby decreasing the weight of the springs required so that the entire weight of the springs in an ordinary wheel is only about two pounds. In practice we have used springs five inches in length, and with this length of spring the number of coils may be greatly varied, thus giving an exceedingly wide range of carrying capacity and making it possible to employ the same spring for any weight of automobile within reasonable limits. With this construction it is possible to employ the same springs for an automobile weighing fifteen hundred pounds, or for one weighing five thousand pounds. The movement of these springs is ordinarily not more than one-fourth of their extensible capacity; as a result of this the life of the spring is greatly prolonged. As the springs are subjected to such a slight extension, it is apparent that the springs can be easily adjusted to any desired weight of load by turning the turn-buckles. A slight adjustment of the turn-buckles may be made to produce a very material change in the tension of the springs. The springs are protected from the injury which would result from extending them too far by the torsional stop. It will be obvious that in this construction the springs and other parts connecting the hub with the tread member, can be quickly and easily assembled or taken apart, thus making it possible to replace a broken spring, or other part of the suspension device, in a very short time. Any wear that is produced on the springs or connected parts, can be easily taken up by the turn-buckles so that the resistance of the springs can be maintained at the desired point.

In Figs. 6, 7 and 8 a modification of the invention is shown. In this modification the tread member of the wheel is constructed in the manner already described.

The hub member is also constructed in the manner already described, except that brackets 30 are substituted in place of the brackets 5 attached to the inner surface of the felly 3. The brackets 30 are somewhat different in form from the brackets 5, being constructed as clearly shown in Figs. 6, 7 and 8.

The suspension device consists of the rod 11, similar to the rod 11 already described; but the other member of the suspension device consists of a rod 31 in place of a spring. The rod 31 is provided with hooks at both ends, one hook passing through an opening or aperture in the upper end of bracket 13, and the hook at the other end engaging with a ring 32 with which the hook at the inner end of the rod 11 also engages. In this form of the invention the operating device consists of a coiled spring 33 provided with hooks at both ends. The hook at the inner end engages with an opening in the bracket 30, and the hook at the outer end engages with the ring 32. It will be seen that this form of the invention differs from the one already described in that the spring member is made a part of the operating device instead of being included in the suspension device. In other respects the two forms of the invention are alike.

It will be obvious that the construction of our improved spring wheel may be changed very much in detail without departing from the spirit or scope of the broad invention, and without sacrificing its main advantages. The invention is therefore not limited to the particular details of construction, but is broad enough to cover the combinations of devices or elements hereinafter recited in the claims.

What we claim as new and desire to secure by Letters Patent, is:

1. In a spring wheel the combination of a wheel member containing a hub, a wheel member containing a tread, a plurality of suspension devices attached at both ends to one of the members and arranged at an angle to the axis of the wheel, and a plurality of operating devices attached by movable joints to the other member and connected to the suspension devices and arranged substantially parallel to the axis of the wheel, thereby suspending the hub member within the tread member, substantially as set forth.

2. In a spring wheel the combination of a wheel member containing a hub, a wheel member containing a tread, a plurality of spring devices attached at both ends to one of the members and arranged at an angle to the axis of the wheel, and a plurality of operating devices attached by movable joints to the other member and connected to the spring devices and arranged substantially parallel to the axis of the wheel, thereby suspending the hub member within the tread member, substantially as set forth.

3. In a spring wheel, the combination of a wheel member containing a hub, a wheel member containing a tread, a plurality of yielding suspension devices attached at each end to one of the members, and a plurality of operating devices attached by movable joints to the other member and connected to an intermediate part of the suspension devices, and the operating devices set parallel to the axis of the wheel, substantially as set forth.

4. In a spring wheel the combination of a wheel member containing a hub, a wheel member containing a tread, a plurality of yielding suspension devices attached at each end to the tread member, and a plurality of operating devices attached by movable joints to the hub member and connected to an intermediate part of the suspension devices and the operating devices set parallel to the axis of the wheel.

5. In a spring wheel the combination of a wheel member containing a hub, a wheel member containing a tread, a plurality of spring suspension devices attached at each end to the tread member, and a plurality of operating rods attached at one end by movable joints to the hub member and connected at the other end to an intermediate part of the suspension devices and the operating devices set parallel to the axis of the wheel.

6. In a spring wheel the combination of a wheel member containing a hub, spokes and felly, a tread member containing a felly, a tire on said felly, and side plates fastened to said felly, a series of brackets attached to each of the side plates of the tread member, a plurality of suspension devices on each side of said wheel connected at their ends with the brackets of the tread member, each suspension device being provided with a turn buckle, a series of brackets connected with the felly of the hub member, and a series of operating devices connected at one end with the brackets of the hub member, and at the other end with some intermediate part of the suspension devices.

In testimony whereof, we have signed our names to this specification, in the presence of two subscribing witnesses.

JOHN F. SIPE.
HARRY E. SIPE.

Witnesses:
EDWIN SEGER,
JOHN O. GEMPLER.

---

Copies of this patent may be obtained for five cents each, by addressing the "Commissioner of Patents, Washington, D. C."